United States Patent [19]

Jasper et al.

[11] 4,392,138
[45] Jul. 5, 1983

[54] APPARATUS AND METHOD FOR DETECTING AND INHIBITING SIGNALS INTERFERING WITH A LORAN C SIGNAL

[75] Inventors: Steven C. Jasper, Schaumburg; Robert V. Janc, Palos Heights, both of Ill.

[73] Assignee: Motorola, Inc., Schaumburg, Ill.

[21] Appl. No.: 222,421

[22] Filed: Jan. 5, 1981

[51] Int. Cl.³ .................................................. H04B 7/00
[52] U.S. Cl. .................................................... 343/103
[58] Field of Search ...................... 343/103; 455/296; 364/452

[56] References Cited

U.S. PATENT DOCUMENTS

| | | |
|---|---|---|
| 3,167,771 | 1/1965 | Cunningham . |
| 3,325,809 | 6/1967 | Meranda et al. . |
| 3,391,344 | 2/1968 | Goldberg . |
| 3,611,383 | 10/1971 | Bar . |
| 3,665,086 | 5/1972 | Magee et al. . |
| 3,736,590 | 5/1973 | Lipsey et al. . |
| 3,743,754 | 7/1973 | Eisenberg . |
| 3,774,210 | 11/1973 | Mollod et al. . |
| 3,870,999 | 3/1975 | Mathews et al. . |
| 3,916,320 | 10/1975 | Roll et al. . |
| 3,925,732 | 12/1975 | Tanaka et al. . |
| 3,934,254 | 1/1976 | Vogeler et al. . |
| 3,947,849 | 3/1976 | Fehlner et al. . |
| 3,949,954 | 4/1976 | Lipsey . |
| 4,019,183 | 4/1977 | Haynes . |
| 4,024,382 | 5/1977 | Fowler . |
| 4,071,898 | 1/1978 | Schorsch et al. . |
| 4,104,635 | 8/1978 | Brodeur . |
| 4,150,380 | 4/1979 | Brodeur . |
| 4,151,528 | 4/1979 | Johannessen . |
| 4,166,275 | 8/1979 | Michaels et al. . |

OTHER PUBLICATIONS

Low Cost Navigation Processing for Loran-C and Omega by James F. DeLorme & Arthur R. Tuppen, ITT Avionics Div., Jun. 25, 1974, p. 21.
LRC-301 Litcom Receiver Manual, 5.2.2.4 CW Interference, pp. 5-14.

*Primary Examiner*—Theodore M. Blum
*Attorney, Agent, or Firm*—Mark P. Kahler; Edward M. Roney; James W. Gillman

[57] ABSTRACT

An interference rejection apparatus is provided which samples the Loran C signal at selected pulse tracking reference points. The Loran C samples are separated into even and odd groups by appropriate summing-weighting circuitry. The even pulse and odd pulse waveforms thus produced are analyzed to determine the presence of an interfering signal which corrupts either of the off or even pulse groups. Upon detection of interference with either the even or odd Loran C samples, strobe dropping is employed to reject the affected group of samples.

1 Claim, 10 Drawing Figures

FIG. 1

| | A | | | | | | | | B | | | | | | | |
|---|---|---|---|---|---|---|---|---|---|---|---|---|---|---|---|---|
| | PULSE No. | | | | | | | | PULSE No. | | | | | | | |
| | 0 | 1 | 2 | 3 | 4 | 5 | 6 | 7 | 0 | 1 | 2 | 3 | 4 | 5 | 6 | 7 |
| MASTER | + | + | − | − | + | − | + | − | + | − | − | + | + | + | + | + |
| SECONDARY | + | + | + | + | + | − | − | + | + | − | + | − | + | + | − | − |

APPARATUS AND METHOD FOR DETECTING AND INHIBITING SIGNALS INTERFERING WITH A LORAN C SIGNAL

BACKGROUND OF THE INVENTION

This invention relates to systems for detecting signals interfering with Loran C signals and, more particularly, to systems for detecting and eliminating interference nearly synchronous with a Loran C signal.

DESCRIPTION OF THE PRIOR ART

To determine the approximate location of a ship or other mobile vehicle a Loran C receiving apparatus may be employed in such vehicle. A typical Loran C radionavigation scheme includes a master transmitting station and at least two secondary transmitting stations situated at different preselected locations. Each station transmits a pulse group, that is a series of eight radio frequency pulses during different nonoverlapping time intervals. More specifically, the master transmitting station transmits a pulse group followed in time by transmission of a pulse group from the first secondary station. After the first secondary station has transmitted a pulse group, the second secondary station transmits a pulse group. This sequence of pulse transmission by the master and secondary stations continues ad infinitum.

The time difference (TD) is defined to be the difference in time between the arrival of the master station signal and one of the secondary station signals at the Loran C receiver site. The time difference associated with the first secondary station and the time difference associated with the second secondary station each varies according to the particular location at which the Loran C receiver is situated. Each time difference is typically displayed by the Loran C receiver such that two intersecting hyperbolic lines of position may be drawn on a map to determine the location of the Loran C receiver site. For a more complete discussion of the Loran C radionavigation scheme, refer to U.S. Patent application, Jasper et. al., Ser. No. 06/222,422 filed Jan. 5, 1981 and assigned to the instant assignee.

A Loran C receiver often must operate in a harsh receiving environment. Undesired extraneous radio frequency signals may be present near or in the passband of the Loran C receiver (typically 90 kHz-110 kHz). To determine the above-discussed time differences, a Loran C receiver typically locks to the third positive-going zero crossings of the carrier of each of the pulses of the pulse groups transmitted by each of the master and secondary stations, respectively. Such third zero crossing is known as the pulse tracking reference point or PTR. The presence of extraneous signals will interfere with and, in extreme cases, completely prevent locking to the pulse tracking reference points of the Loran C pulse groups resulting in decreased accuracy of location determination or complete prevention of location determination. It is clear that attenuation of such extraneous interfering signals is desirable.

For interfering signals outside of the Loran C receiver passband a notch filter is adequate to attenuate such signals. However, employment of a notch filter within the Loran C signal bandwidth undesirably results in Loran C signal pulse distortion. To eliminate or substantially reduce the effects of interference within the Loran C signal passband, the composition of the Loran C signal must be carefully examined.

Figure 1:
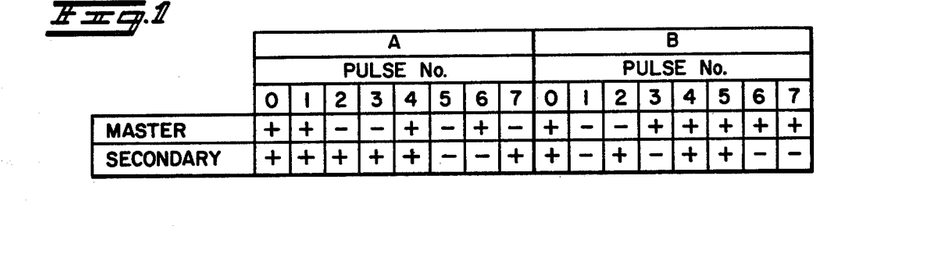
FIG. 1 is a table showing the phase codes of the individual pulses of the master and secondary station pulse groups.

As mentioned, a typical Loran C signal comprises a pulse group of eight radio frequency pulses followed in in time by another pulse group of eight pulses one group repetition interval (GRI) later and so forth. The eight pulses, designated 0, 1, 2, ... 7 for convenience, include a group of four even numbered pulses 0, 2, 4 and 6 and a group of four odd numbered pulses 1, 3, 5 and 7. Each of the eight pulses is assigned a phase code, namely zero degrees (+1) or 180 degrees (−1). This phase coding may also be referred to as weighting. Each master or secondary station transmits alternately one of two phase code sequences designated A and B. The actual phase code for each of the eight pulses of a type A or B pulse group is shown in FIG. 1. The two different group phase code sequence A and B are cycled alternately A B A B A and so forth during transmission by the master and secondary stations.

Figure 2:
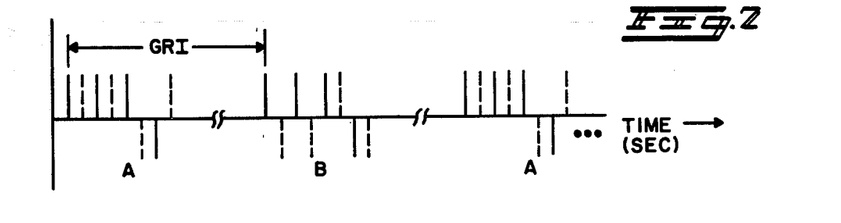
FIG. 2 is a graph of Loran C signal pulses versus time showing the phase coding of the pulses comprising the pulse groups of a secondary station.
Figure 3:
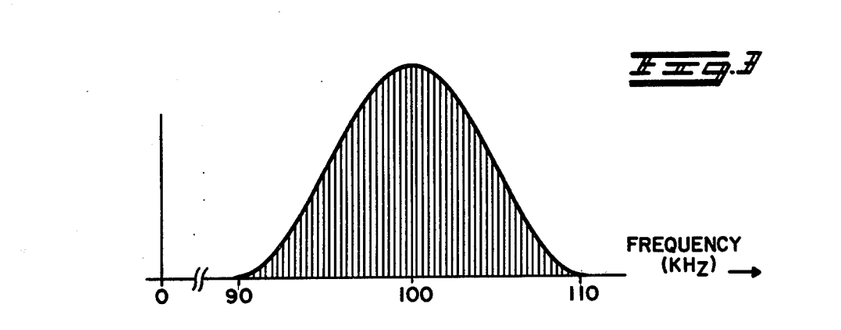
FIG. 3 is a graph of the frequency spectrum of a Loran C signal shown in large scale.
Figure 4:
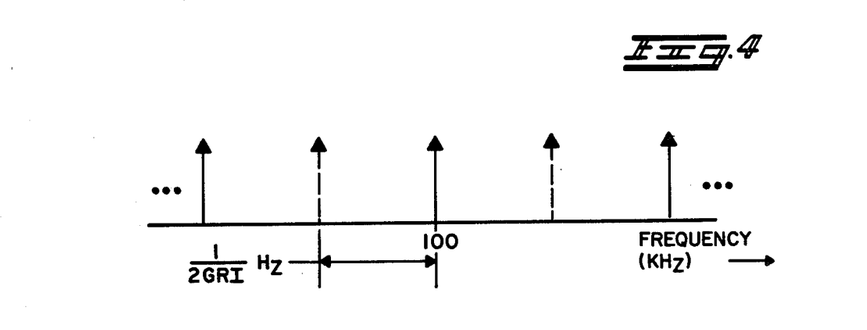
FIG. 4 is a graph of the frequency spectrum of a Loran C signal shown in small scale.

It is noted that the Loran C pulses are of two types, namely the even numbered pulses whose phase codes remain the same from one pulse group to the next and the odd numbered pulses whose phase codes alternate in sign from one pulse group to the next. The even pulses are thus periodic and exhibit a period equal to the group repetition interval (GRI). FIG. 2 shows typical secondary station pulse groups transmitted in A B A B fashion. The even pulses are shown as solid lines and the odd phases are shown as dashed lines. FIG. 3 shows the frequency spectrum of a Loran C signal in small scale. The Loran C frequency spectrum appears as a bell-shaped curve centered about 100 kHz. FIG. 4 shows the frequency spectrum of a typical Loran C signal in small scale. As mentioned, the even Loran C pulses are periodic and exhibit a period equal to the group repetition interval. Thus, such even phase-coded Loran C pulses generate spectral lines at integer multiples or 1/GRI Hertz as shown in FIG. 4 by the vertical solid lines. The odd phase-coded Loran C pulses are also periodic having a frequency equal to that of the group repetition interval, but such odd pulses have an alternating sign or phase. Thus, as shown in FIG. 4 by the vertical dashed lines such as sequence of odd pulses generates spectral lines at integer plus ½ multiples of 1/GRI Hertz. The odd spectral lines are situated midway between the even spectral lines. Therefore when a Loran C signal is transmitted, spectral lines result every 1/(2 GRI) Hertz.

To receive a Loran C signal exhibiting the spectrum seen in FIG. 4, a comb filter or the equivalent thereof is typically employed in the Loran C receiver. A separate comb tooth is provided for each spectral line such that even and odd spectral lines are received. The comb filter substantially attenuates undesired signals and noise apparatus between the spectral lines. The comb filter performs well to allow locking of the Loran C receiver to the PTR of each Loran C pule when an interfering signal exhibits a frequency between the even and odd spectral lines. However, if an interfering signal approaches the frequency of a spectral line (nearly synchronous interference) or exhibits a frequency equal to that of a spectral line (synchronous interference), then the comb filter is ineffective for rejecting such signal. Under these conditions loss of lock with the PTR may occur.

One technique employed to avoid the effects of synchronous or nearly synchronous interference is strobe dropping. It is noted that if an interfering signal has a frequency approximately the same as an even spectral line, the odd spectral lines of the Loran C signal are unaffected. In a like manner, if an interfering signal has a frequency approximately the same as an odd spectral line of an Loran C signal, then the even spectral lines are unaffected by the interference. Thus, when an interfering signal is present which affects the even Loran C pulses, the samples or strobes of such pulses are dropped, that is, effectively rejected. The then remaining even pulse samples are employed to determine the location of the Loran C receiver. Correspondingly, if a synchronous or nearly synchronous interfering signal is present which affects the odd Loran C signal samples, such samples are dropped and only the remaining even numbered pulses samples are relied on to determine the location of the Loran C receiver. It is apparent that to employ strobe dropping, a detector must be provided to detect the presence of the interference and determine which of either the even or odd Loran C signal samples are being affected by such an interference. One detector for achieving this function involves generating auxiliary sampling strokes to sample the interfering signal prior to the occurrence of each Loran C master pulse.

It is one object of the present invention to achieve detection of synchronous or nearly synchronous interference without generating extra auxiliary Loran C signal samples by utilizing only the PTR samples.

Another object of the invention is to successfully avoid the deleterious effects of synchronous or nearly synchronous Loran C signal interference.

These and other objects of the invention will become apparent to those skilled in the art upon consideration of the following description of the invention.

BRIEF SUMMARY OF THE INVENTION

The present invention is directed to eliminating or substantially reducing the effects of an interfering signal synchronous or nearly synchronous with a Loran C signal.

In accordance with one embodiment of the invention, apparatus for substantially eliminating the corruptive effects of such an interfering signal having a frequency nearly synchronized with a Loran C signal include a receiver for receiving the Loran C signal pulse groups and the interfering signal. A sampling circuit is coupled to the receiver for sampling the Loran C signal at pulse tracking reference points thereof to generate Loran C signal samples. A first discriminating circuit is coupled to the sampling circuit. The first discriminating circuit rejects even Loran C samples if the absolute value of the summation of a predetermined number of even weighted pulse group sums exceeds a predetermined threshold level. A second discriminating circuit is coupled to the sampling circuit. The second discriminating circuit rejects odd Loran C samples if the absolute value of the summation of a predetermined number of odd weighted pulse group sums exceeds the predetermined threshold level. The first and second discriminating circuits cooperate to reject Loran C signal samples affected by the interfering signal and provide output to the remaining unaffected Loran C signal samples.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

BRIEF DESCRIPTION OF THE DRAWINGS

FIG. 8B is a graph of a typical waveform produced at the output of the even weighting-summing circuit of FIG. 8A.

FIG. 8C is a graph of a typical waveform produced at the output of the odd weighting-summing circuit of FIG. 8A.

DETAILED DESCRIPTION OF THE PREFERRED EMBODIMENT

Figure 5:
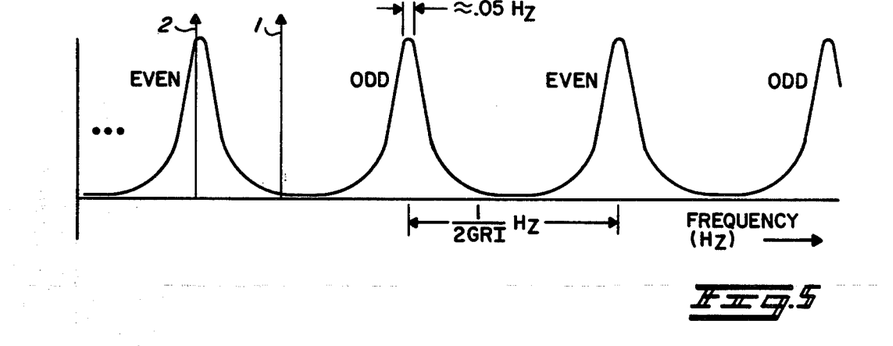
FIG. 5 shows the relationship between the teeth of a comb filter employed in a Loran C receiver and the Loran C spectral lines.

FIG. 5 shows the comb filter type response (not to scale) typically exhibited by conventional Loran C receivers. Alternating comb teeth correspond respectively to the alternating even-odd spectral lines generated by Loran C signals. As shown, the bandwidth of a typical tooth is quite narrow, for example, 0.05 Hz. A narrowband interfering signal designated 1 having a frequency between the frequencies of the teeth of the comb filter response is shown in FIG. 5 as a spectral line. Such nonsynchronous interfering signals as 1 are readily rejected by the comb filter. However, a nearly synchronous interfering signal such as that designated as 2 in FIG. 5 exhibits a frequency which falls within a tooth of the comb filter response. A comb filter type response fails to reject such narrowband interfering signals. The above-mentioned comb filter type response which eliminates some nonsynchronous interference is conveniently implemented by employing a phase lock loop in a manner well known to those skilled in the art. The present invention, however, is directed to inhibiting interfering signals which exhibit a frequency synchronous or nearly synchronous with one of the even or odd spectral lines of the Loran C signal.

Figure 6:
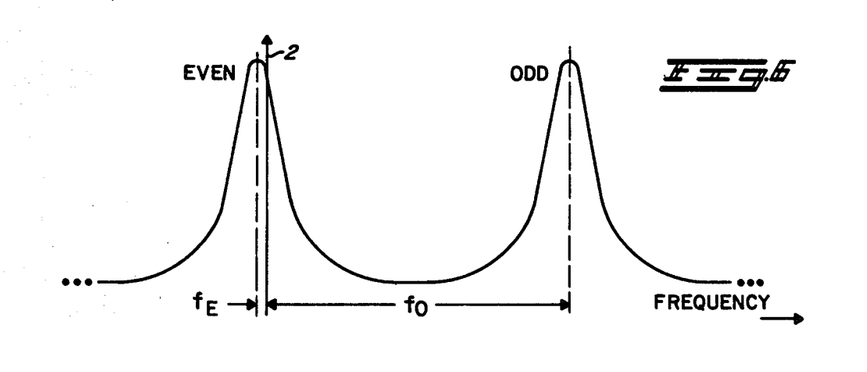
FIG. 6 is a close up view of two teeth of the Loran C comb filter of FIG. 5 and the corresponding Loran C spectral lines.

FIG. 6 shows a close up view (not to scale) of an even comb tooth and an odd comb tooth of FIG. 5 including interfering signal 2 which exhibits a frequency nearly synchronized with the even tooth. The amount of frequency spectrum between the center of the comb tooth affected by interfering signal 2 (that is, the even tooth here) and interfering signal 2 is designated $f_E$. The amount of frequency spectrum between interfering signal 2 and the next closest adjacent tooth is designated $f_O$. The terms $f_E$ and $f_O$ will be discussed in more detail subsequently.

Figure 7B:
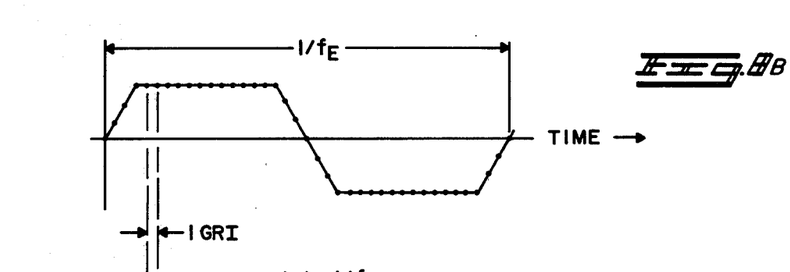
FIG. 7 is a block diagram of the interference detector of the present invention.
Figure 7C:
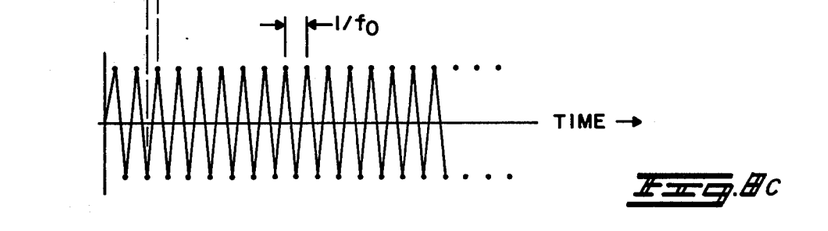

The interference rejection apparatus of the present invention includes an antenna 10 as shown in FIG. 7. Antenna 10 is preferably omnidirectional and exhibits dimensions appropriate for receiving a Loran C signal. A receiver 20 is coupled to the antenna 10 for receiving the Loran C signals. Receiver 20 typically comprises conventional radio frequency (RF) amplification circuitry tuned to the frequency of the Loran C signals. Receiver 20 is coupled to a sampling circuit 30 which samples the Loran C signals at the pulse tracking reference point (PTR) of each pulse thereof as instructed. A microprocessor (not shown) may conveniently be employed to facilitate instructing the sampling circuit 30 when to sample the Loran C signal in one embodiment of the invention. PRT samples are thus generated by sampling circuit 30.

A first discriminating circuit 40 is coupled to the output of sampling circuit 30 so as to receive the PTR sample of each pulse of the Loran C signal. Discriminating circuit 40 operates on the even pulse samples of each Loran C pulse group to determine if a narrowband interfering signal is present having a frequency synchronous or nearly synchronous with one of the even Loran C spectral lines (or corresponding comb teeth). A second discriminating circuit 50 is coupled to the output of sampling circuit 30 to receive the pulse tracking reference samples therefrom. Discriminating circuit 50 operates on the odd pulse samples of each group to determine if a narrowband interfering signal is present having a frequency synchronous or nearly synchronous with one of the odd spectral lines of the Loran C signal. If discriminating circuit 50 determines that the odd Loran C pulses have been interfered with, then the odd pulse samples are rejected and are not included in the output. This, discriminating circuit 50 does not allow odd pulse samples to reach subsequent circuitry whenever the odd pulses are subject to synchronous or nearly synchronous interference. Likewise, discriminating circuit 40 does not allow even Loran C pulse samples to reach subsequent circuitry whenever an interfering signal is present which interferes with the even pulses.

The outputs of discriminating circuits 40 and 50 are respectively coupled to the inputs of a two input adding circuit 60. Thus, if there is no interfering signal present which is synchronous or nearly synchronous with either the even or odd Loran C pulses, both the even and odd pulse samples are provided output respectively by discriminating circuits 40 and 50. Under these conditions the even and odd pulses are combined by adding circuit 60 and are both employed to control the frequency of a signal generated by a phase lock loop circuit 70 which is coupled to adder 60. The output of phase lock loop 70 comprises the output of the interference rejection apparatus of the present invention. The phase lock loop 70 output which generates the current best estimate of the pulse tracking reference, is coupled to sampling circuit 30 to assure that the Loran C signal is sampled at the current best estimate of the pulse tracking reference.

If discriminating circuit 40 determines that an interference signal is present which affects the even Loran C signal samples, then the unaffected odd samples are provided output through adder 60. In this case, the even samples are rejected or not provided output by discriminating circuit 40 and thus do not reach adder 60 for combination with the odd samples. Conversely, if the odd Loran C samples are interfered with, then the even Loran C samples are provided output to adder 60 whereas the odd Loran C samples are rejected and not allowed to reach adder 60 for combination with the even samples. In this manner, interference which affects in the alternative either the even Loran C samples or the odd Loran C samples is effectively rejected.

Discriminator circuit 40 includes an even pulse weighting-summing circuit 80 having an input 80A corresponding to the input of discriminating circuit 40 as seen in FIG. 7. Weighting-summing circuit 80 selects the four even Loran C samples from each group of 8 Loran C samples (that is from the pulse group occurring during each group repetition interval). Weighting-summing circuit 80 appropriately weights, that is multiplies, each of the four even coded Loran C signal samples selected per GRI by $+1$ or $-1$ according to the polarity of the individual pulse as shown in the table of FIG. 1. For example, a Loran C signal sample corresponding to the No. 0 (even) pulse of an A type Loran C pulse group from a master station is multiplied by $+1$; a Loran C sample of pulse No. 2 (even) of a B type Loran C pulse group from a master station is multiplied by $-1$ and so forth. Weighting-summing circuit 80 sums each of the so weighted Loran C samples once per group repetition interval. Thus, weighting-summing circuit 80 provides one even weighted pulse group sum per GRI.

Discriminating circuit 40 includes an even interference detection circuit 90 which is coupled to the output of weighting-summing circuit 80 to receive the waveform produced thereby. It is noted that the frequency content of the waveform at the output of weighting-summing circuit 80 gives an indication of the presence and type of interference which may be present on a received Loran C signal. If no interference with even samples is present, the waveform at the output of weighting-summing circuit 80 is random and noiselike. However, if a narrowband interfering signal is present which is synchronous with or nearly synchronous with a Loran C spectral line (here, an even line, for example) then the waveform at the output of the weighting-summing circuit 80 is periodic and exhibits a frequency f equal to the frequency offset between the interfering signal and the center of the nearest even spectral line. More specifically, a nearly synchronous interfering signal produces a waveform at output 80B having an extremely low frequency, for example, less than 0.2 or 0.3 Hz. To determine whether a synchronous or nearly synchronous interfering signal is present which affects the even Loran C samples, even interference detection circuit 90 distinguishes among very low frequency signals (indicating presence of even pulse interference), noiselike signals (indicating no narrowband interference) and high frequency periodic signals (indicating the presence of narrowband interference, but that such interference is desirably out of the receiver passband for the even pulses.) The actual implementation of even weighting-summing circuit 80 and even interference detection circuit 90 will be discussed later in detail.

Discriminating circuit 50 includes an odd weighting-summing circuit 100 which operates in a manner similar to weighting-summing circuit 80 except on odd Loran C samples. Odd weighting-summing circuit 100 includes an input 100A which corresponds to the input of discriminating circuit 50. Weighting-summing circuit 100 includes an output 100B. Circuit 100 operates on odd Loran C samples to select the four odd coded samples per GRI and multiply each of such four samples by the appropriate weight ($\pm 1$) corresponding thereto as shown in FIG. 1. For example, pulse No. 1 of an A type pulse group from a master transmitting station is multiplied by $+1$. Pulse No. 3 of an A type group from a master station is multiplied by $-1$ by odd weighting-summing circuit 100 and so forth. After multiplication by the appropriate phase code in accordance with the above, each of the four Loran C samples per GRI are summed by weighting-summing circuit 100 to generate an odd weighted pulse group sum. Thus, circuit 100 provides one odd weighted pulse group sum per GRI.

Weighting-summing circuit output 100B is coupled to the input of an odd pulse interference detecting circuit 110 as shown in FIG. 7. Interference detecting circuit 110 is similar to even pulse interference detection circuit 90 except that detecting circuit 110 determines the presence of an interfering signal affecting the odd Loran C signal samples. Odd interference detecting circuit 110 receives and analyzes the waveform generated at output 100B. Detecting circuit 110 distinguishes among the various 100B output waveforms, namely, a very low frequency signal (indicating nearly synchronous or synchronous interference with odd samples), noiselike signals (indicating that no narrowband interference is present) and high frequency periodic signals (indicating the presence of narrowband interference out of the receiver passband for odd pulses). The outputs of interference detecting circuits 90 and 110 correspond respectively to the outputs of discriminator circuits 40 and 50.

Figure 8A:
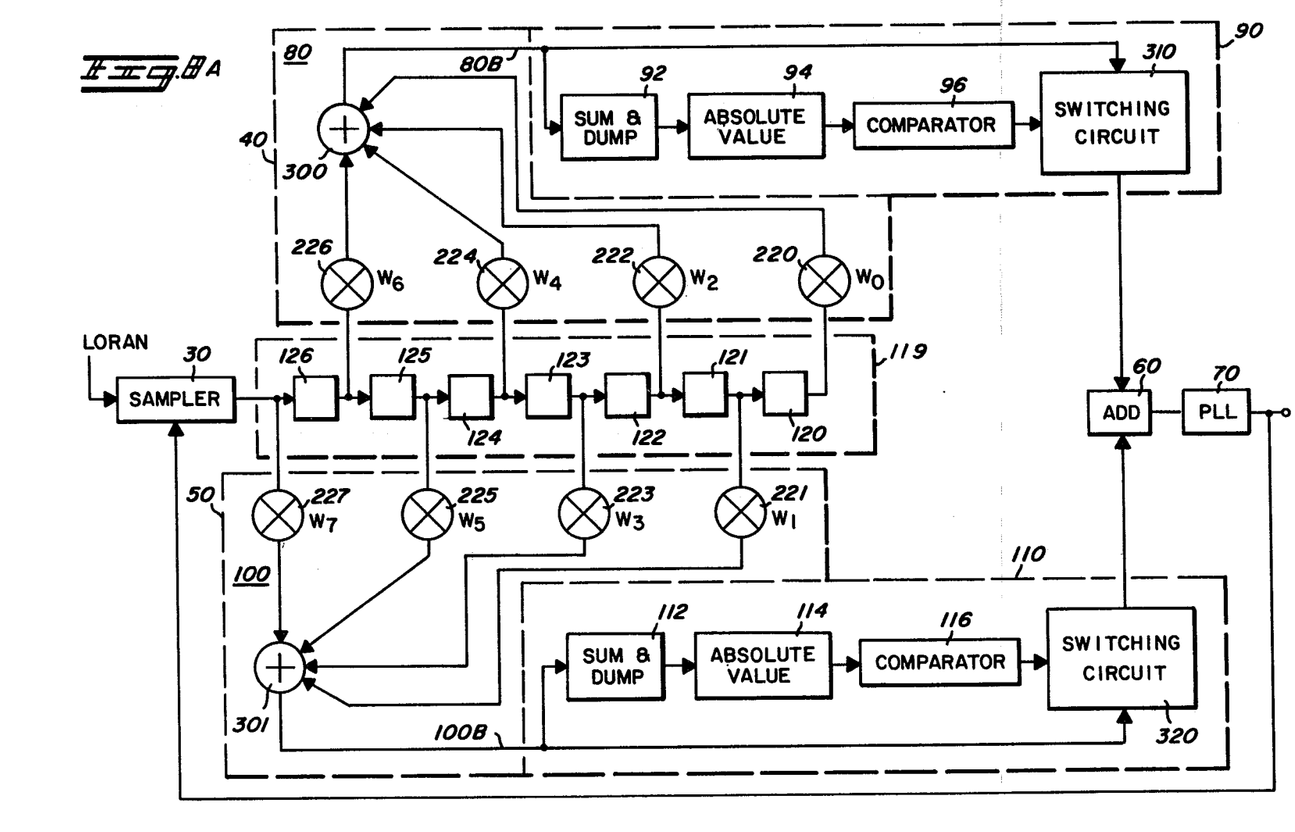
FIG. 8A is a detailed block diagram of the interference detector of FIG. 7.

FIG. 8A shows a detailed block diagram of discriminator circuits 40 and 50. Discriminating circuits 40 and 50 include a bank 119 (shown separately for convenience) of seven time delay circuits designated 120, 121, ... 126. Time delay circuits 120-126 are shared between discriminating circuits 40 and 50 in the manner subsequently described. Time delay circuits 120-126 are serially coupled together in descending numerical order as shown in FIG. 8A to form a tapped delay line. The output of time delay circuit 126 is coupled to the input of time delay 125 and so forth in descending order through time delay circuit 121, the output of which is coupled to the input of time delay circuit 120. The time delay provided by each of time delay circuits 120-126 is equal to the time between each Loran C pulse of an eight pulse group, namely, 1 msec.

The output of sampling circuit 30 is coupled to the input of delay circuit 126 such that each group of eight Loran C signal pulses of a particular GRI are provided to delay circuit bank 119. The group of eight Loran C pulse samples travels along the signal path formed by tapped delay line circuit 119. Pulse sample 0 reaches the output of delay circuit 120 at the same time pulse No. 1 reaches the output of time delay circuit 121. At the same time, pulse No. 2 reaches the output of time delay circuit 122 and so forth through time delay circuit 126, the output of which is receiving pulse No. 6 and the input of which is receiving pulse No. 7 at the same time. It is seen that this time delay circuit configuration readily allows the even numbered samples and the odd numbered samples to be segregated into two groups because the physical location of each of the pulses of a pulse group is known when the pulse 0 reaches the output of time delay circuit 120. The output of time delay circuit 120 and the outputs of time delay circuits 122, 124 and 126 are respectively coupled to the inputs of multiplying circuits (weighting circuits) 220, 222, 224 and 226 to segregate the even samples 0, 2, 4 and 6 from the remaining four odd numbered pulse samples. The outputs of time delay circuits 121, 123, 125 and the input time delay circuit 126 are respectively coupled to the inputs of multiplying circuits (weighting circuits) 221, 223, 225 and 227 to segregate the selected odd numbered Loran C samples from the even numbered samples.

Each of weighting circuits 220-227 multiply the sample passing therethrough by an appropriate weighting factor of +1 or −1 according to the number of such pulse (0-7) and the polarity of such pulse as shown in FIG. 1. A microprocessor (not shown) including appropriate memory and control circuitry may be conveniently employed to instruct multiplying circuits 220-227 in accordance with the table of FIG. 1 to weight the samples as per such table. The appropriate weights to be employed in multi pliers 220-227 are designated $W_0, W_1, \ldots W_7$ and vary from pulse sample to pulse sample explained above. The outputs of multipliers 220, 222, 224 and 226 are respectively coupled to the four inputs of a four input adding circuit 300. Adding circuit 300 produces an output signal which is the sum of the weighted samples on each of its inputs. An even weighted pulse group sum is thus generated at the output of adder 30 once per GRI. The output signal of adder 300 produces a waveform when observed over successive GRI. The outputs of multiplying circuits 221, 223, 225 and 227 are respectively coupled to the four inputs of an adding circuit 301. Adder 301 generates an odd weighted pulse group sum at its output once per GRI. The output signal of adder 301 forms a waveform when viewed over successive GRI.

As explained in more detail subsequently, the waveforms at the outputs of adder 300 and adder 301 are analyzed to determine the presence of a narrowband signal interfering with the even Loran C pulse samples or the odd Loran C pulse samples. FIGS. 8B and 8C respectively show typical output signals of adder 300 and adder 301 when a synchronous or nearly synchronous signal is applied to the interference rejection apparatus of FIG. 8A.

Even pulse interference detection circuit 90 includes a sum and dump circuit 92 coupled to even weighter-summer output 80B. Sum and dump circuit 92 sums the even weighted pulse group sums provided at the input thereof for every N even pulse group sums. N equals a selected number which determines a detection period. After each group of N Loran C even weighted pulse group sums have occurred, sum and dump circuit 92 provides output to the aforementioned even weighted sums which themselves have been summed by sum and dump circuit 92. The output of sum and dump circuit 92 is coupled to the input of an absolute value circuit 94 to assure that the summed even weighted sums exhibit a positive polarity. The output of absolute value circuit 94 is coupled to the input of a comparator 96 set at a predetermined threshold level T. If the summed even weighted sums have a value greater than T, comparator 96 produces an output signal which turns a switching circuit 310 off. Switching circuit 310 is connected between the output 80B of even weighter-summer 80 and one input of the two input adding circuit 60. Thus, if the threshold T is exceeded in comparator circuit 96, switching circuit 310 becomes nonconductive and decouples the even weighted sums produced at the output 80B of weighter-summer 80 from adder 60.

It is again noted that even pulse interference detection circuit 90 examines the waveform at the output of weighter-summer 80. High frequency waveforms (which correspond to interference outside the even pulse receiver passband) or noiselike signals (which correspond to no interference) tend to average out to a value near 0 when acted upon by interference detection circuit 90 and thus on the average produce a summed even weighted sum less than the predetermined threshold T at which comparator 96 is set. Thus, for such waveforms, interference affecting the even pulse samples is deemed not to be detected. In this case, comparator 96 produces no output signal and switching circuit 310 remains in a conductive state desirably causing the even weighted sums produced at weighter-summer output 80B to be coupled to an input of adder circuit 60. Simply speaking, no even pulse interference is found when the even pulse waveform is averaged and found to have a value less than T. Thus, the noncorrupted weighted sums are coupled to subsequent circuitry, namely adder 60 and phase lock loop 70 when no even pulse interference is detected.

However, if weighter-summer 80 provides a low frequency waveform to detection circuit 90, the threshold T is exceeded at comparator 96 because such low frequency signals which correspond to synchronous or near synchronous tend to be unipolar during the detection period N. More specifically, when the even weighted sums generated at weighter-summer 80 exhibit such low frequency characteristics, the summation of such generally unipolar low frequency sums at sum and dump circuit 92 yields a summed odd weighted sum at comparator 96 which exceeds threshold T. When threshold T is exceeded, an interfering signal corrupting the even Loran C samples is deemed to be detected. In response, comparator 96 generates an output signal which, as per the above, causes switching circuit 310 to become nonconductive and prevent even weighted pulse group sums generated at adder 300 from reaching adder 60 and phase lock loop 70.

Odd pulse sample interference detection circuit 110 is essentially identical to interference detection circuit 90 except that interference detection circuit 110 determines the presence of an interfering signal corrupting the odd pulse samples. Odd pulse detection circuit 110 is coupled to the output 100B of odd pulse weighter-summer 100 to enable analysis of the odd weighted sum waveform present at output 100B. Odd pulse interference detection circuit 110 includes a sum and dump circuit 112 as shown in FIG. 8A. Sum and dump circuit 112 sums the odd weighted sums provided by weighter-summer 100 over every N Loran C pulse samples. The output signal of sum and dump circuit 112 is thus a plurality of summed odd weighted sums. The output of sum and dump circuit 112 is coupled to an absolute value circuit 114 such that all of the summed odd weighted sums are provided with the same positive polarity. The output of absolute value circuit 114 is coupled to the input of comparator 116 which is set at a threshold level T, conveniently the same as the threshold for comparator 96. The output of comparator 116 is coupled to a switching circuit 320. Switching circuit 320 is coupled between the output of odd pulse weighter-summer 100 and the second input of adding circuit 60 such that switching circuit 320 is normally conductive. That is, switching circuit 320 is conductive and allows odd weighted sums from weighter-summer 100 to pass through to adder 60 when no output signal is received from comparator 116 (that is, when the threshold T is not exceeded at comparator 116). Such is the case when the waveform provided to detection circuit 110 is noise-like (no narrowband interference) or comprises high frequency periodic signals (out of odd passband narrowband interference). Such signals which have many positive and negative excursions during the detection period N tend to average out to near 0 and thus the threshold T is not exceeded. Since under these conditions no interference affecting odd samples is detected, the odd weighted sums from weighter-summer 100 are passed by switching circuit 320 to adder 60 and subsequent circuitry, namely phase lock loop 70.

However, if weighter-summer 100 provides a low frequency waveform to detection circuit 110, then the threshold T is exceeded at comparator 116. This occurs because such low frequency signals which correspond to synchronous or nearly synchronous interference tend to be unipolar during the detection period N. When the odd weighted sums produced by weighted summer 100 exhibit such low frequency characteristics, the summation of such unipolar low frequency sums at sum and dump circuit 112 yields a summed odd weighted sum at comparator 116 which exceeds the selected T threshold. When the threshold T is exceeded, an interfering signal corrupting the odd Loran C pulse samples is deemed to be detected. Comparator 116 produces an output signal which instructs switching circuit 320 to become non-conductive, thus rejecting the corrupted odd Loran C samples and not allowing such samples to reach adder 60. Phase lock loop circuit 70 generates a signal locked in frequency to the frequency of the even and/or odd Loran C pulses. The output signal from phase lock loop circuit 70 is coupled to sampling circuit 30 to instruct sampling circuit 30 to sample the received Loran C signal at the current estimate of the PTR which such output signal represents.

Although the above-described interference rejection apparatus performs well in accurately detecting the presence of a narrowband interfering signal, the likelihood of falsely detecting the presence of interference may be reduced by employment of the present invention in conjunction with the interference detection apparatus described and claimed in the Jasper et al. patent application, "Apparatus and Method for Determining the Frequency of a Periodic Signal," Ser. No. 222,422), filed Jan. 5, 1981) and assigned to the instant assignee. The output of the cited Jasper et al. interference detector may be combined via an AND circuit with the outputs from even pulse interference detection circuit 90 and odd pulse interference detection circuit 110 in a manner readily appreciated by those skilled in the art such that the strobe dropping switching circuits 310 and 320 drop or reject respective even weighted sums or odd weighted sums only when both interference detectors deem that an interfering signal is actually present. The likelihood of falsing is thus lessened.

In accordance with the above discussion of interference rejection apparatus it is seen that a method for substantially eliminating the corruptive effects of an interfering signal having a frequency nearly synchronized with a Loran C signal is provided. To summarize, this method includes the steps of receiving Loran C signal pulse groups and an interfering signal. The Loran C signal is sampled at pulse tracking reference points thereof to generate Loran C signal samples. Even Loran C samples are rejected if the absolute value of the summation of a predetermined number of even weighted pulse group sums exceed a predetermined threshold level. Odd phase coded Loran C samples are rejected if the absolute value of the summation of a predetermined number of odd weighted pulse group sums exceeds a predetermined threshold level conveniently the same as the threshold level mentioned above. Thus, the Loran C signal samples affected by an interfering signal are rejected leaving the unaffected samples remaining.

It is noted that in actual practice, the interference rejection apparatus of the present invention is used on a station by station basis. That is, Loran C signal samples from more than one station are not grouped together in one interference rejection apparatus since the random time delays between stations would destroy the unipolar signal. It is apparent that the unipolar characteristic of sampled near synchronous interference is important to the present invention which utilizes such characteristic to determine if an interfering signal is present. Thus, a separate interference rejection apparatus is employed for each of the master and secondary stations.

The foregoing describes an apparatus and method for rejecting interference which corrupts either the even Loran C samples or the odd Loran C samples taken by a Loran C receiver. Such interference rejection is accomplished without the employment of auxiliary sampling strobes before each master station pulse. Rather, the signal information contained in the Loran C PTR samples is employed to determine if a nearly synchronous interfering signal is present. If such an interfering signal is determined to be present, strobe dropping is initiated.

While only certain preferred features of the invention have been shown by way of illustration, many modifications and changes will occur to those skilled in the art. It is, therefore, to be understood that the present claims are intended to cover all such modifications and changes as fall within the true spirit of the invention.

I claim:

1. An interference avoidance apparatus for substantially eliminating the corruptive effects of an interfering signal having a frequency nearly synchronized with a Loran C signal formed by a plurality of even and odd numbered Loran C pulses including in combination:

receiving means for receiving Loran C signal pulse groups and said interfering signal;

a single sampling circuit, coupled to said receiving means, for sampling said Loran C signal at most once per Loran C pulse at pulse tracking reference points thereof to generate even and odd numbered Loran C signal samples;

tapped delay line means, coupled to said sampling circuit, for separating said even numbered Loran C samples from said odd numbered Loran C samples, said even Loran C samples being provided to a first plurality of delay line outputs and said odd Loran C samples being provided to a second plurality of delay line outputs;

even phase code weighting means coupled to said first plurality of delay line outputs for weighting said even Loran C signal samples according to the respective phase code of each of said even samples to generate weighted even samples;

first summing means, coupled to said even phase code weighting means, for summing the weighted even samples so as to generate one first weighted sum per Loran C pulse group;

odd phase code weighting means coupled to said second plurality of delay line outputs, for weighting said odd Loran C signal samples according to the respective phase code of each of said odd samples to generate weighted odd samples;

second summing means, coupled to said odd phase code weighting means, for summing the weighted odd samples so as to generate one second weighted sum per Loran C pulse group;

even pulse interference detecting means, coupled to said first summing means, for selectively rejecting the even Loran C samples if the absolute value of the summation of a predetermined number of first weighted sums exceeds a predetermined threshold level;

odd pulse interference detecting means, coupled to said second summing means, for selectively rejecting the odd Loran C samples, if the absolute value of the summation of a predetermined number of second weighted sums exceeds a predetermined threshold level, whereby the Loran C signal samples affected by said interfering signal are rejected and the remaining samples are provided output.

* * * * *